INVENTORS
WILLIAM WALKER
GEORGE H. CURRY

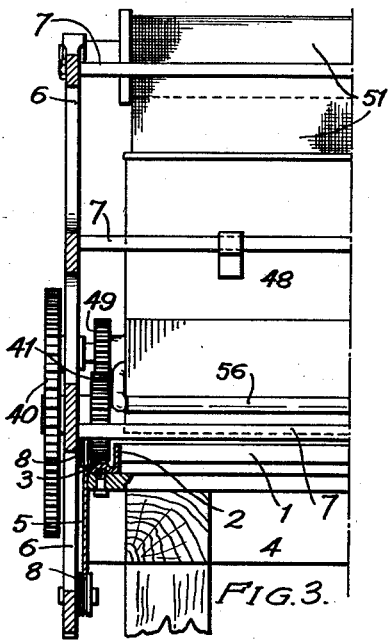
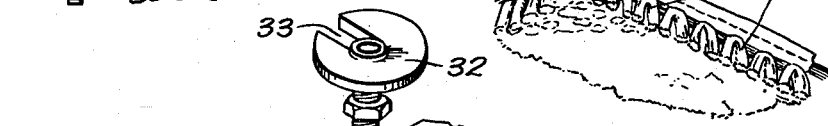
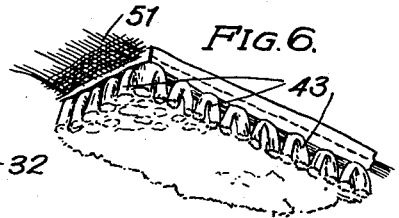
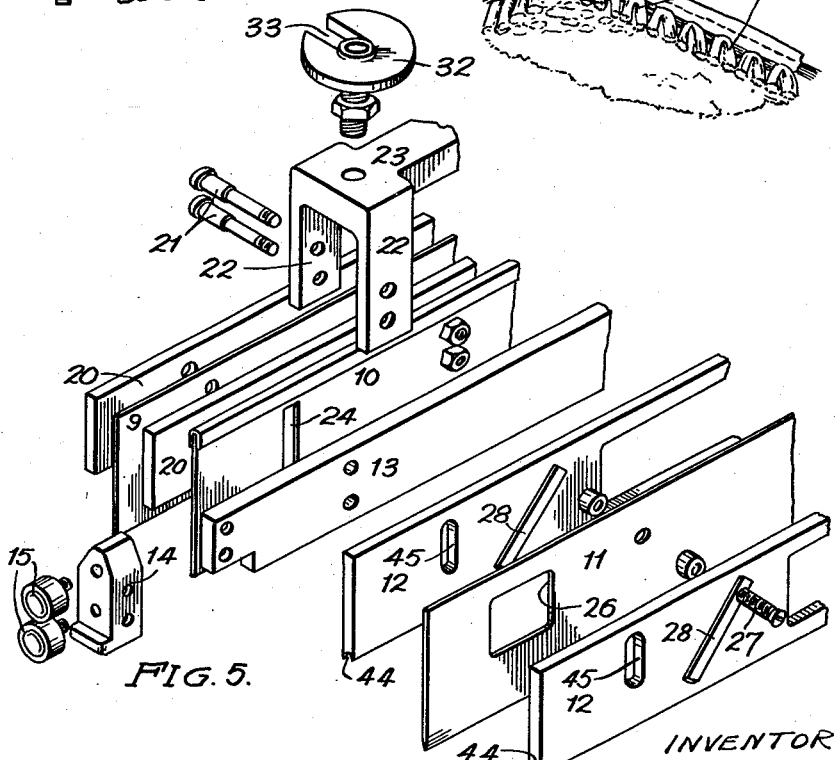

Patented Aug. 31, 1937

2,091,744

UNITED STATES PATENT OFFICE 2,091,744

APPARATUS FOR MANUFACTURING PILE FABRIC

William Walker and George Humphrey Curry, Murton Colliery, England

Application March 20, 1936, Serial No. 69,965
In Great Britain April 10, 1935

5 Claims. (Cl. 154—1)

This invention relates to pile fabric which is produced without any weaving operation and comprises a carrier sheet of rubber or similar pliable material in which is anchored or embedded the base portions of transversely looped or pleated pile elements, the resulting fabric having a non-slip, waterproof underside and capable of being cut and laid after the manner of linoleum without the necessity of binding up the edges to prevent fraying.

The rubber or other pliable carrier sheet of the fabric produced in accordance with this invention is preferably reinforced by a sheet of woven textile material which backs or is embedded in said carrier sheet, or by loose textile fibres distributed through or laid upon the carrier sheet.

The method of making the pile fabric according to this invention consists in arranging a number of warp strands in parallel formation, pressing down said strands transversely at intervals into close set looped formation and applying a plastic (e. g. rubber) coating to the bends of the looped strands which are disposed in transverse rows.

The apparatus employed consists broadly of a grid member for supporting a layer of parallel warp strands, a looping assembly incorporating a reciprocating looper for producing transversely arranged rows of loops in the warp strands, means for applying a coating or sheet of rubber or similar plastic material to the loops on the upper face of the warp-strand layer and means for effecting a relative traversing movement between the strands and the looping and coating means.

For making a cut pile fabric a loop-cutting knife is incorporated in the looping assembly and preferably oscillates from side-to-side simultaneously with the reciprocation of the looping assembly.

The grid member may be of flat form and composed of a series of equi-distantly spaced strips on edge and at right angles to the direction of the relative traversing movement between the warp-strand layer and the looping and coating means. The grid may be stationary and the looping assembly moved over the face of the grid, or the looping assembly may be fixed and the grid traversed thereunder. In the latter case the grid may be in the form of a cylinder or of an endless belt.

A suitable form of appartus for making cut pile fabric in accordance with the invention is illustrated in the accompanying drawings, wherein:—

Figures 2 and 3 are fragmentary transverse cross sections on II, II and III, III of Figure 1 respectively, Figure 4 is an enlarged fragmentary cross section on IV, IV of Figure 2, Figure 5 is a detail view showing the component parts of the looping and cutting assembly separated, and Figure 6 is a fragmentary section parallel to the warp strands of the cut pile fabric produced.

Figure 1:
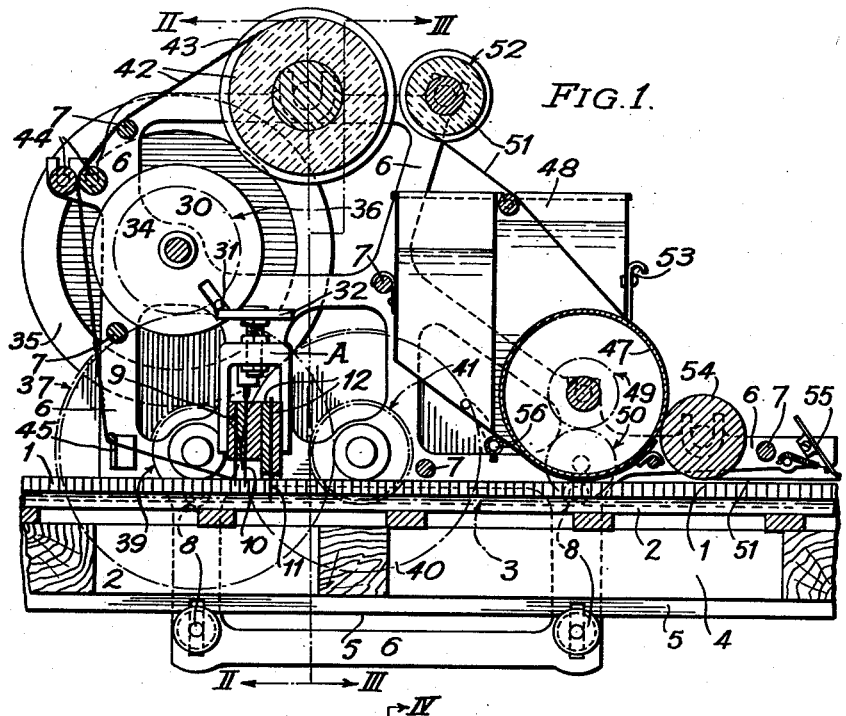
Figure 1 is a sectional elevation of the machine and part of a grid employed.
Figure 2:
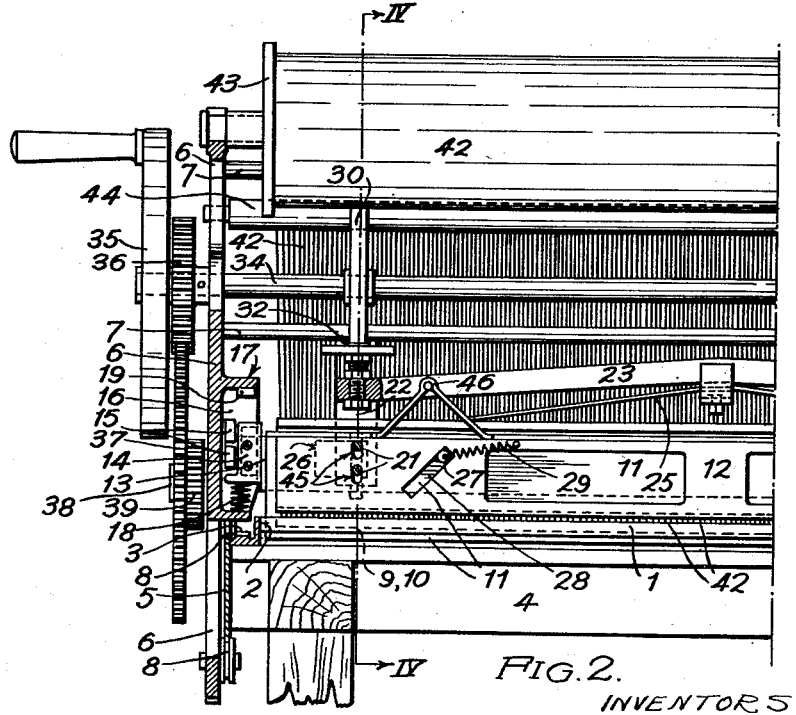

The grid consists of equidistantly spaced lateral strips 1 extending between two longitudinal supports 2, each provided with a toothed rack 3, and supported horizontally on a table 4, having longitudinal rail plates 5. The looping, cutting and coating machine consists of two side frames 6 connected together by transverse rods 7 and provided with guide rollers 8 which roll along the rail plates 5.

The looping and cutting assembly is arranged parallel to the grid strips 1 and incorporates a looper blade 9, a loop retainer 10, a loop-cutting knife 11, and clamp bars 12 for holding the warp strands during the cutting operation. A main supporting bar 13 is provided which has at its oposite ends fixed caps 14 each carrying rollers 15 to guide the assembly as it reciprocates vertically, the rollers 15 co-operating with guide faces 16 provided in boxes 17 formed in the side frames 6. The assembly is normally held in an elevated position by springs 18, (one on each side of the machine) and rubber pads 19 are provided in the boxes 17 to cushion the upward spring-urged movement of the looper assembly. The supporting bar 13 is sandwiched between the fixed looper blade 9, loop retainer 10 and two packing strips 20 on one side, and the knife 11 and the two clamp bars 12 on the other side. The assembled components are supported by bolts 21 extending across the fork ends 22 of the yoke 23. The loop retainer 10, has slots 24 to permit of vertical movement thereof relative to the fixed looper blade 9, excessive upward movement being prevented by the leaf spring 25. The knife 11 has slots 26 for embracing the yoke bolts 21 to guide same horizontally, the side-to-side oscillatory movement of knife 11 being effected positively by roller-supporting pins 27 thereon moving along inclined slots 28 in the clamp bars 12, the knife 11 being reset to the normal elevated position by springs 29.

The looping and cutting assembly is periodically depressed by a pair of rotating discs 30, one at each side of the machine, each having a radially adjustable peg 31 for co-operating with a tappet 32 adjustably supported by the yoke 23. The tappet 32 has a peripheral gap 33 through which the disc 30 passes. The amount of the reciprocation of the assembly can be adjusted by means of the pegs 31 and/or the tappets 32, to control the depth of pile looped in. The discs 30 are carried by a main shaft 34 provided at opposite ends with flywheels 35 having handles to facilitate rotation by hand. Alternatively the shaft 34 may be power-driven. Pinions 36 on the shaft 34 mesh with spur wheels 37 carried by the frame 6 on stud axles 38 and pinions 39 on said stud axles 38 drive other spur wheels 40 associated with gear wheels 41 adapted to mesh with the grid racks 3 so as to traverse the machine over the grid. The gear train ratios are such that the looping and cutting assembly reciprocates so as to lower the looper, loop retainer and knife into the space between each pair of adjacent grid strips.

The warp strands 42 which are carried on a freely revoluble warp beam 43 pass down between tension rollers 44 and through a comb 45 to the looper 9 which loops them down between the grid strips. The portions of strands 42 previously looped are retained while the looper 9 is operating by the yielding loop retainer 10. The looper 9 and loop retainer 10 are spaced at one grid pitch apart. The oscillating knife 11 (situated at a distance of several grid pitches behind the loop retainer 10) operates to cut through the roots of the strand loops 43 which during the cutting operation are held by the channelled underfaces of the clamp bars 12, cushioning strips 44 being provided within the clamp bar channels. A slight vertical movement of the clamp bars 12 relative to the yoke 23 is necessary in view of the adjustments made to control pile depth, and this movement is allowed for by providing the clamp bars 12 with vertical slots 45 through which the yoke bolts 21 pass. Springs 46 permit the clamp bars 12 to yield when said bars have contacted with the looped strands before the knife reaches the roots thereof. The rubber carrier sheet is formed by the deposition, on the crests of the inverted U-loops which are straddled on the grid strips, of a coating of rubber solution which is fed by a drum 47 which projects through an aperture in the rear end of a tank 48 holding said solution, the drum being rotated from the rack 3 by means of gear wheels 49, 50.

The rubber solution is picked up on both faces of a web of fabric 51 which is supported on a transverse reel 52 above the tank 48. The thickness of the coating is adjusted by elevating or lowering a weir 53 at the top of the drum aperture. The web 51 with its coat of rubber passes beneath a vulcanizing roller 54 which presses the web and rubber coat on to the loop crests, the fabric being further consolidated by a spring-controlled pivoted blade 55. A suitable wetting agent is sprayed on to the cut warp loops through a perforated pipe 56. The machine is moved along the racks 3 by turning the main shaft 34 and when the looper 9 is over a space between a pair of grid strips 1 the disc pegs 31 press down the looper assembly A with the result that a loop is formed. As the traversing frame moves on the looper 9 is brought over the next grid space, when it is again pressed downwards, during which movement, the loop retainer 10 presses into the loop previously formed so that the strands are securely held. Shortly after the looper 9 comes down and forms a second loop. This cycle of operations is repeated until the knife 11 comes over the looped fabric, loop cutting being carried out simultaneously with the looping, but with a lag of a number of grid pitches between the looper 9 and the knife 11.

When one grid has thus been traversed, the machine is moved on to another grid and the above operations repeated. Meantime the fabric on the first grid is allowed to dry off, vulcanization of the rubber being accelerated if desired by heat treatment. When the vulcanization is complete, the resulting fabric is stripped from the grid and is ready for use. What was the top of the fabric is now the base.

We claim:

1. Apparatus for the production of a pile fabric comprising a grid element having numerous parallel spaced apart strips, means for folding material over the edges of said strips into the spaces therebetween to provide around and between said strips successive oppositely disposed U-shaped formations in the material, means for cutting the loop portions of the U-shaped formations between the strips while said formations are disposed between said strips, and means for applying a connecting backing to the loop portions of the U-shaped formations around said strips.

2. Apparatus for the production of a pile fabric comprising a grid element having numerous parallel spaced apart strips, reciprocable means for folding material over the edges of said strips into the spaces therebetween to provide around and between said strips successive oppositely disposed U-shaped formations in the material, means reciprocable with said first mentioned means for cutting the loop portions of the U-shaped formations between the strips while said formations are disposed between said strips, and means for applying a connecting backing to the loop portions of the U-shaped formations around said strips.

3. Apparatus for the production of a pile fabric comprising a grid element having numerous parallel spaced apart strips, reciprocable means movable with respect to said grid element transversely relative to the strips thereof for continuously folding material over the edges of successive of said strips into the spaces therebetween to provide around and between said strips successive oppositely disposed U-shaped formations in the material, reciprocable means reciprocable with said first mentioned means for cutting the loop portions of the U-shaped formations between the strips while said formations are disposed between said strips, means reciprocable with said second mentioned means for cooperation with the strips to hold the U-shaped formations around said strips engaged with said strips during cutting of the loop portions of the U-shaped formations between said strips, and means for applying a connecting backing to the loop portions of the U-shaped formations around the strips.

4. Apparatus as set forth in claim 2 in which the reciprocable cutting means comprises a knife, and in which means are provided for imparting longitudinal shearing movement to said knife at right angles to its direction of reciprocation during reciprocation thereof.

5. Apparatus for the production of a pile fabric comprising a support, a grid element on said support having numerous parallel spaced apart strips, guide rails on said support extending transversely relative to said strips, a rack on said support, a carriage mounted on said guide rails for movement therealong over said strips, a rotatable shaft on said carriage, a connection between said shaft and said rack whereby rotation of said shaft moves said carriage over said strips, a frame on said carriage reciprocable toward and from said strips, means operated by rotation of said shaft to reciprocate said frame once during each increment of movement of the carriage corresponding to the spaced apart relationship between adjacent strips, material holding means on the carriage, a blade carried by said frame effective to force material into the spaces between successive strips as the carriage is advanced along the support and the frame is reciprocated, means on said frame effective to hold the material within the space between each adjacent pair of the strips as the blade forces the material into the space between the next adjacent pair of strips, a knife on said frame effective to sever the loop portions of the U-shaped formations of the material produced by the blade cooperating with the strips, and means for applying a connecting backing to the loop portions of the inverted U-shaped formations of the material left extending over the edges and downwardly along the sides of the strips.

WILLIAM WALKER.
GEORGE HUMPHREY CURRY.